(No Model.)	3 Sheets—Sheet 2.
W. P. SMITH.
HORSE CHECKING DEVICE.
No. 399,708.  Patented Mar. 19, 1889.
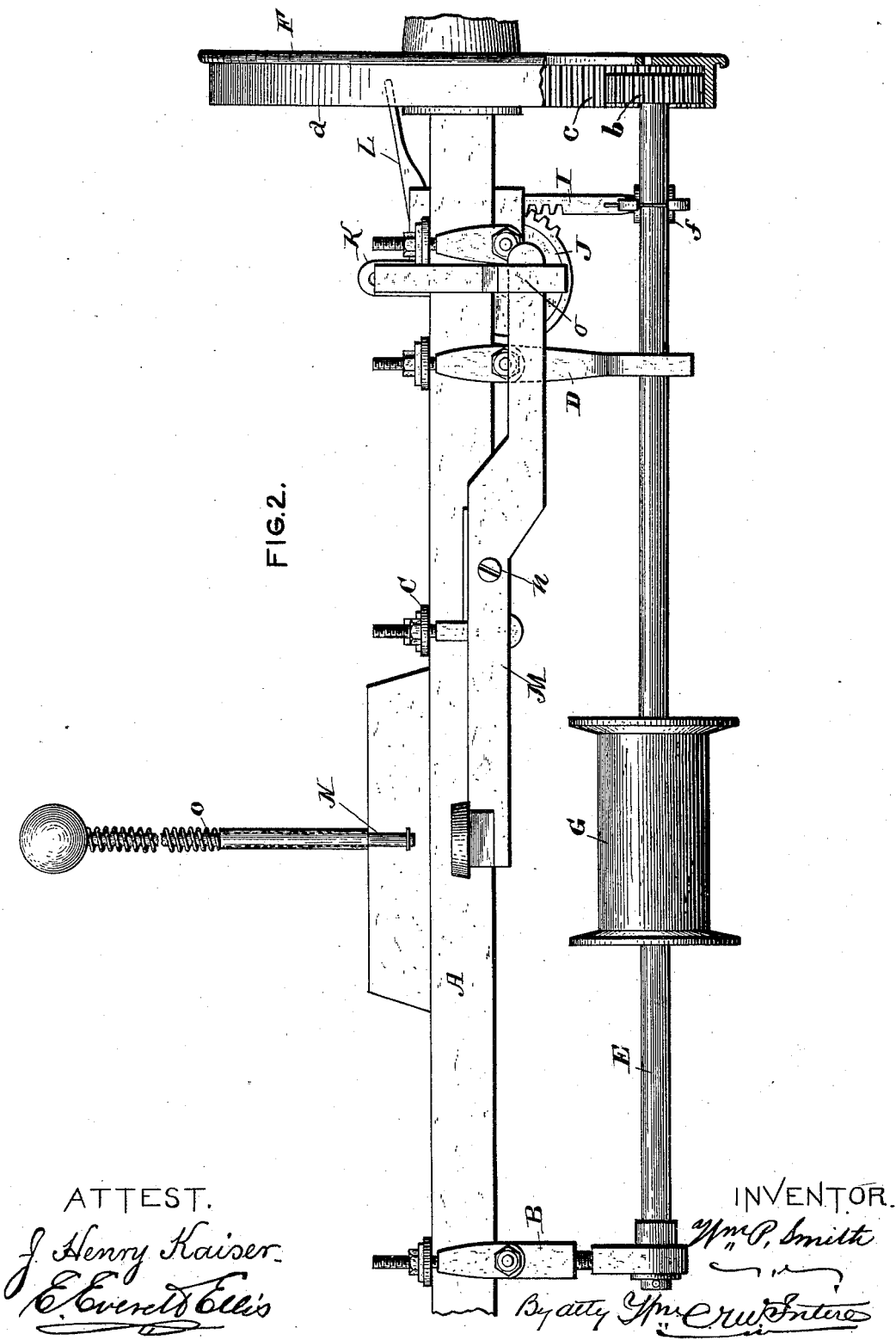
ATTEST.
J. Henry Kaiser
E. Everett Ellis
INVENTOR.
Wm. P. Smith
By atty (No Model.) 3 Sheets—Sheet 3.
W. P. SMITH.
HORSE CHECKING DEVICE.
No. 399,708. Patented Mar. 19, 1889.
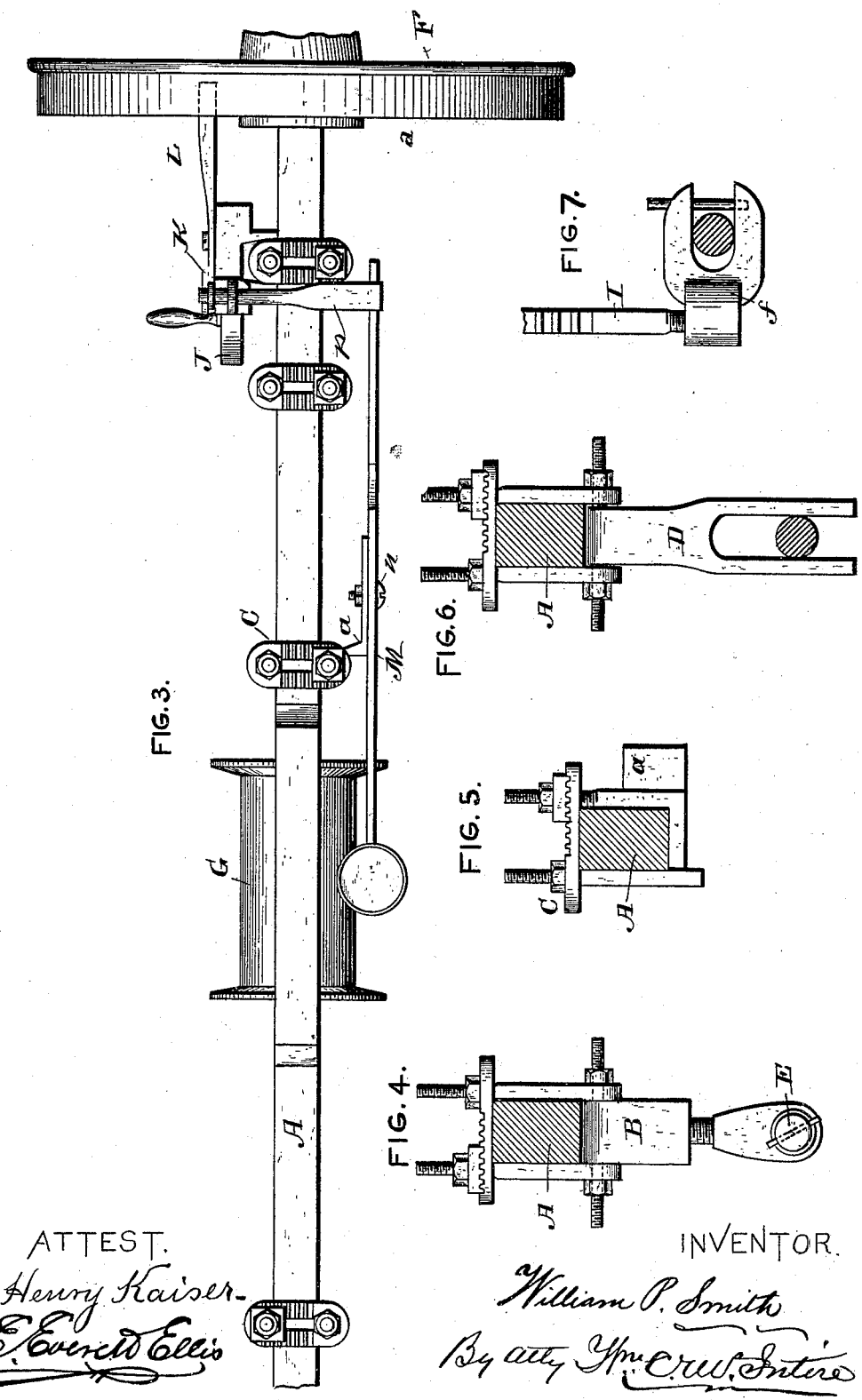
ATTEST.
J Henry Kaiser
E. Everett Ellis
INVENTOR.
William P. Smith
By atty Wm C. W. McIntire

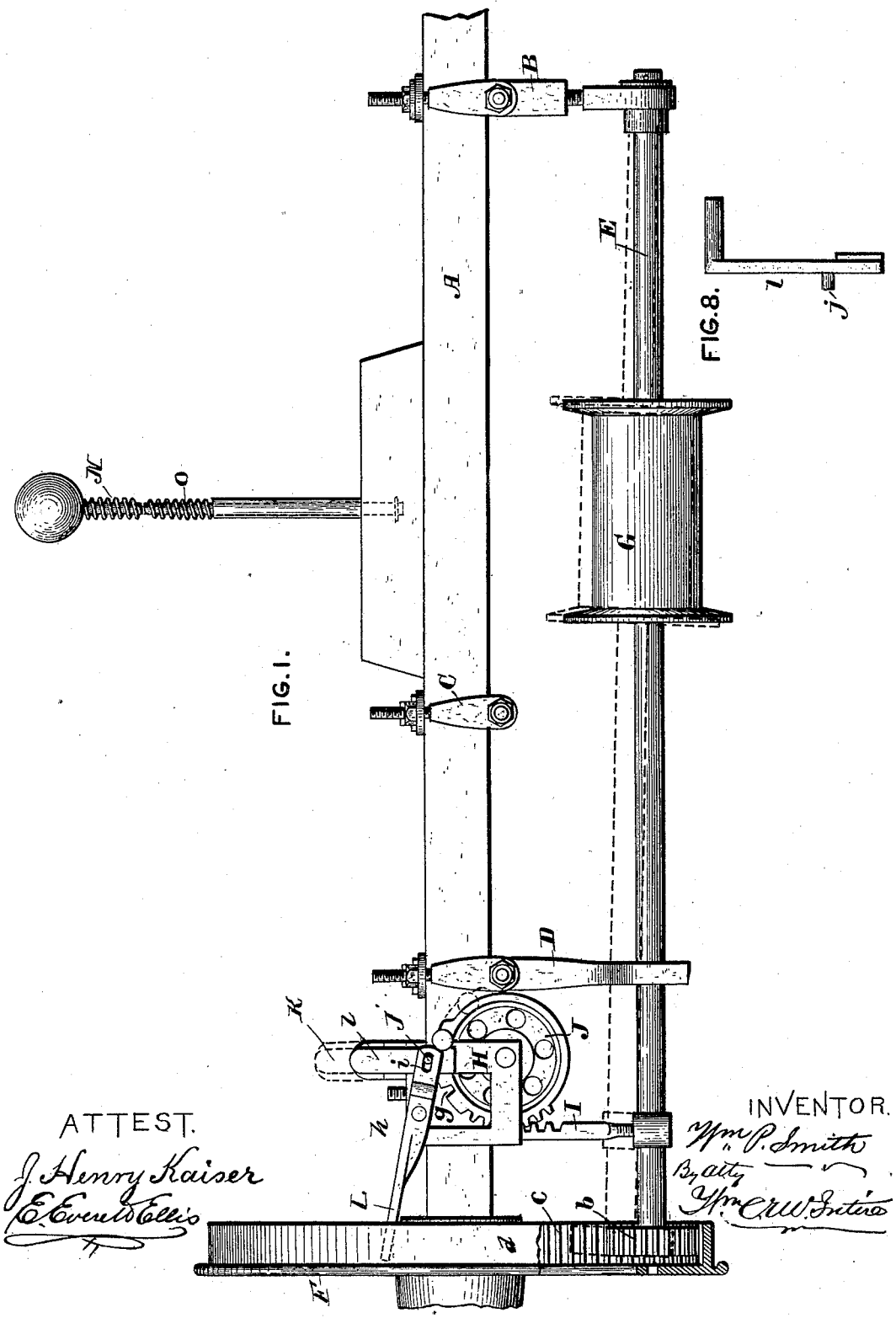

UNITED STATES PATENT OFFICE.

WILLIAM P. SMITH, OF RENTON, WASHINGTON TERRITORY.

HORSE-CHECKING DEVICE.

SPECIFICATION forming part of Letters Patent No. 399,708, dated March 19, 1889.

Application filed November 8, 1888. Serial No. 290,259. (No model.)

*To all whom it may concern:*

Be it known that I, WILLIAM P. SMITH, a citizen of the United States, residing at Renton, Washington Territory, have invented new and useful Improvements in Vehicle-Brakes to Prevent Horses from Running Away, of which the following is a specification.

This invention relates to certain new and useful improvements in automatic brakes for wagons and other vehicles; and it consists substantially in such features of construction, arrangement, and combinations of parts as will hereinafter be more particularly described, and pointed out in the claims.

The object of the invention is to supply simple and effective automatic mechanism for locking the wheels of wagons and other vehicles to prevent horses or teams from running away, and thereby lessening the liability to destruction of life and property so frequently resulting from runaway teams.

Further, the invention has for its object to supply mechanism of the character referred to which shall be capable of operation by the driver or occupant of the vehicle before alighting therefrom, and also to so arrange and combine the several parts as that their action shall always be positive and reliable, all as will hereinafter be more particularly described, when taken in connection with the accompanying drawings, wherein—

Figure 1 represents a longitudinal side elevation of the automatic brake mechanism preferably employed by me for large or heavy vehicles, and Fig. 2 is a similar view of the same mechanism taken from the opposite side to Fig. 1, and with slight modifications to better adapt the same to buggies or light vehicles. Fig. 3 is a top or plan view of my improved automatic brake mechanism; and Figs. 4, 5, 6, 7, and 8 are detail views, respectively, to better indicate the general construction and arrangement of several of the parts.

Before proceeding with a more full description of my invention, I desire to state that while I have herein shown certain preferred constructions and combinations of parts, it will be obvious that various changes and modifications therein could be made without materially departing from the intended objects and spirit of the invention.

Reference being had to the several parts by the letters marked thereon, A represents an ordinary front axle of a wagon or other vehicle, having secured thereto at one end by suitable screws, and depending therefrom, a bracket or hanger, B, while at other points of said axle is attached or secured a bracket, C, having an arm, *a*, and another guiding-bracket, D, for a shaft, E, that is held or supported at one end by the hanger B, as shown. The said shaft E is provided at its opposite or free end with a pinion, *b*, that is adapted to engage with the toothed inner surface, *c*, of the annular flange or rim *d*, projecting from the side of a ring, F, designed to surround the hub of one of the wheels of a vehicle and be secured in any preferred manner either to said hub or the spokes of the wheel.

The shaft E is provided with a cylinder or drum, G, to which is intended to be secured the end of a strap or line leading from the mouth of the horse, which cord is to be slack while the horse or team is being driven and the brake is open; but as soon as the brake is applied said strap or line will be wound around said drum, as will be hereinafter explained, and the horse or team thereby checked or prevented from running away.

Working in a frame or case, H, secured to the axle A is a vertically-moving lifting rack-bar, I, the lower end of which is shaped or constructed to embrace or surround the shaft E, as shown at *f*, while the upper end thereof is free. Also working in said case H is a hand-wheel, J, toothed for a part of its periphery to engage the rack-bar I, and having a notch, *g*, into which enters the lower end of a vertically-moving lock-plate, K, when in its downward position.

L represents a foot-lever, pivoted at *h* to the side of the frame or case H, and having at one end a small slot, *i*, fitting over a stud or pin, *j*, projecting from the side of a movable plate, *l*, working in the side of said case.

When the shaft E is raised or elevated, as shown in dotted lines, Fig. 1, the wagon or vehicle is free to be driven without check; but when it is desired to apply the brake mechanism the operator simply places his foot on the lever L and presses down. This will free the lock-plate from the notch $g$ in wheel J and raise the said plate to the position indicated in dotted lines, Fig. 1, and the shaft will fall downward of its own weight, and the pinion on its end will engage with the corrugations or teeth of the ring F. When this has been effected, the turning of the vehicle-wheel will cause the shaft E and its drum to rotate, and this will wind up a line or strap that is intended to be secured to said drum and extend to the mouth of the horse, thereby exerting such a backward strain or pull on the horse as to absolutely prevent his running away, it being evident that the more the horse tries to run the greater will be the strain exerted to hold him back.

The mechanism thus far described is such as is preferred in connection with large or heavy vehicles; but for the purpose of buggies and similar light vehicles I prefer to use, in connection with the mechanism already referred to, a lever, M, having its fulcrum on a screw, $n$, passing through the arm $a$ of the bracket C, the said lever having formed with or secured thereto an upright arm, $o$, having a right-angle portion, $p$, that passes through the locking-plate K, so that when the lever is operated said plate will be released in the manner hereinbefore described. The said lever is operated by an upright rod, N, having its bearing in any suitable portion of the buggy or vehicle, and having a spring, O, for retracting the same after it has been depressed. By depressing said rod its lower end will contact with the free end of said lever and act to elevate the opposite end, as well as the locking-plate, thus allowing the shaft E to fall down into place, as in the instance before referred to. To elevate the shaft, it is simply necessary to turn the hand-wheel a suitable distance, and this will raise the rack I, by which the shaft is supported. After elevating the shaft the lock-plate is forced down to engage the notch $g$ of the wheel, and thus will the shaft be sustained until the brake mechanism is again tripped.

Having thus described my invention, what I claim as new, and desire to secure by Letters Patent, is—

1. The combination, with a wagon or other vehicle, of a ring surrounding the hub of one of the wheels and toothed on its inner surface, a shaft supported in hangers from the vehicle, and having a pinion adapted to engage the teeth of the ring and a drum arranged thereon, the wheel J, having notch $g$, the lock-plate, and the foot-lever, substantially as described.

2. The combination, with the shaft E, of the rack-bar shaped or constructed at its lower end to embrace said shaft, and having its upper end free, the case H, the wheel for engaging the rack-bar having the notch $g$, the locking-plate, the sliding plate $l$, having stud $j$, and the pivoted foot-lever having a slot working on said stud, substantially as described.

3. The combination, with the brake mechanism herein described, of the pivoted lever M, having arm $o$ and $p$, and the rod N, having retracting-spring O, substantially as described.

In testimony whereof I have hereunto set my hand in the presence of two subscribing witnesses.

WILLIAM P. SMITH.

Witnesses:
E. EVERETT ELLIS,
CURTIS LAMMOND.